Patented Jan. 30, 1945

2,368,336

UNITED STATES PATENT OFFICE 2,368,336

DISUBSTITUTED THIOBARBITURIC ACID DERIVATIVES AND SALTS THEREOF, AND PROCESS OF PRODUCING THE SAME

Lewis A. Walter and Louis H. Goodson, East Orange, N. J., assignors to The Maltbie Chemical Company, Newark, N. J., a corporation of New Jersey No Drawing. Application May 14, 1942,
Serial No. 443,021

28 Claims. (Cl. 260—260)

The present invention relates to certain new and useful 5,5 disubstituted thiobarbituric acid derivatives, and their salts, having useful hypnotic or sedative properties, and having the formula:

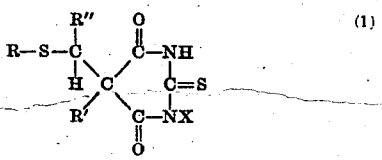

wherein R is a hydrocarbon group either saturated or unsaturated; R' is a primary hydrocarbon group, either saturated or unsaturated; R" is a saturated hydrocarbon group; and wherein R, R' and R" each contain not more than six carbon atoms; and the sum of the carbon atoms in R, R' and R" does not exceed ten; R has a carbon atom attached directly to the sulfur of the thiocarbinyl group

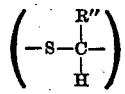

and R' has a carbon atom attached directly to the carbon atom forming the barbituric acid nucleus; and wherein X is a meber of a group consisting of hydrogen, alkali-metal, an equivalent of alkaline earth metal, ammonium, monoalkylammonium, dialkylammonium, alkanol ammonium and an equivalent of alkylene diammonium.

These novel thiobarbituric acid compounds, and their salts, when tested pharmacologically, have been found to possess useful hypnotic and sedative properties, making them valuable for various medical purposes. The compounds are, in general, white or pale yellow in color, and are generally crystalline solids.

In general, the following method has been found desirable, and is the best now known to us, for the preparation of our novel thiobarbituric acid derivatives herein described; but other methods of synthesis may also be employed, as for example, synthesis through the corresponding disubstituted cyano acetic ester.

According to what is at present a preferred procedure for synthesis, a disubstituted malonic ester (such as may be prepared, for example, in accordance with United States Letters Patent No. 2,354,234, patented July 25, 1944) is condensed with thiourea in the presence of sodium ethoxide in an organic solvent such as, for example, absolute alcohol. When reaction is complete, the solvent is removed by distillation and the residue is dissolved in water. The aqueous solution is then extracted with ether and the aqueous layer is separated and acidified, yielding a precipitate of the desired thiobarbituric acid, which may be filtered off and purified by crystallization from a suitable solvent such as ethanol.

The following specific examples are illustrative of the novel compounds according to our invention:

EXAMPLE 1

*5-isoamylthioethylidene-5-ethyl-2-thiobarbituric acid*

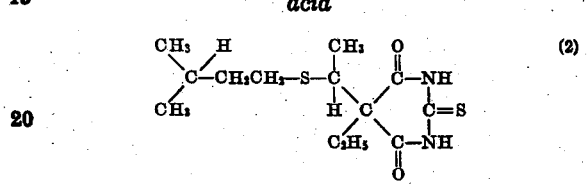

To 19.5 grams of sodium dissolved in 400 cc. of absolute alcohol, 30 grams of thiourea and 112 grams of isoamylthioethylidene ethyl malonic ester are added. This mixture is refluxed for 14 hours, the alcohol is removed by vacuum distillation and the residue dissolved in 300 cc. of water. The resulting solution is extracted with ether and the aqueous layer separated and acidified, yielding a precipitate of 5-isoamylthioethylidene-5-ethyl-2-thiobarbituric acid. This compound is purified by crystallization from alcohol. It melts at approximately 108–110° C.

EXAMPLE 2

*5-n-butylthioethylidene-5-allyl-2-thiobarbituric acid*

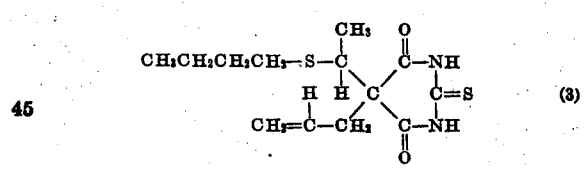

Following the same procedure as in Example 1, 43 grams of n-butylthioethylidene allyl malonic ester is condensed in absolute alcohol with 11.5 grams of thiourea and 7 grams of sodium in the form of sodium ethoxide. The desired thiobarbituric acid was crystallized from alcohol and melts at approximately 79–81° C.

EXAMPLE 3

*5-ethylthio-n-butylidene-5-ethyl-2-thiobarbituric acid*

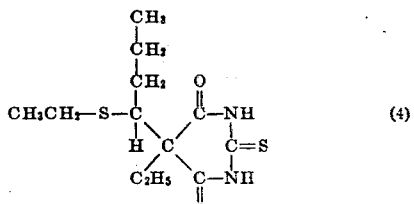

Following the same procedure as in Example 1, 101 grams of ethylthio-n-butylidene ethyl malonic ester is condensed in absolute alcohol with 289 grams of thiourea and 17 grams of sodium in the form of sodium ethoxide. The desired thiobarbituric acid was crystallized from alcohol and melts at approximately 146–147° C.

EXAMPLE 4

*5-ethylthio isobutylidene-5-ethyl-2-thiobarbituric acid*

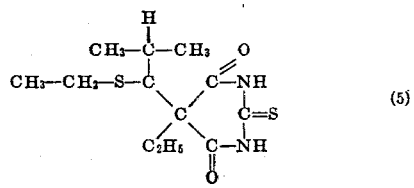

To a solution of 4.6 grams of sodium in 210 cc. of absolute alcohol are added 15 grams of thiourea and 52.5 grams of ethylthio isobutylidene ethyl malonic ester. The mixture is refluxed for 9 hours, the alcohol distilled in a vacuum, and the residue dissolved in 150 cc. of water. The aqueous solution is extracted with ether, separated, and acidified to give the desired thiobarbituric acid. It is crystallized from alcohol and melts at approximately 133–134° C.

In the preparation of the novel thiobarbituric acid derivatives, and their salts, according to our invention, we have found that the substituent groups R, R' and R'', as described and defined above, may be varied considerably, within those limits, while producing good results and useful or valuable compounds; and among the derivatives specifically included in the invention are the following illustrative examples of our novel compounds, all of which we have prepared and tested pharmacologically:

Thiobarbituric acid

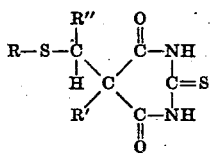

wherein:

| R is— | R' is— | R'' is— | Approximate melting point °C. |
|---|---|---|---|
| Methyl | n-Propyl | Methyl | 111–114 |
| Ethyl | Ethyl | n-Propyl | 146–147 |
| Do | do | Isopropyl | 133.5–134 |
| Do | n-Hexyl | Methyl | 101–103 |
| Allyl | Isobutyl | do | 153–154 |
| n-Butyl | Ethyl | do | 111–113 |
| Do | do | Ethyl | 107.5–108.5 |
| Do | n-Propyl | Methyl | 104–106 |
| Do | Allyl | do | 79–81 |
| n-Amyl | Ethyl | do | 106–107 |
| Isoamyl | do | do | 108–110 |
| Cyclohexyl | Methyl | do | 150.5–151.5 |

In the foregoing examples the melting points are approximate and uncorrected; but are those which we actually observed according to a procedure believed to be reliable.

While we have not prepared all compounds falling within the class defined and claimed herein, those described and named are believed to be fairly illustrative of the class. It is to be noted, however, that the compounds which we describe and claim herein are only compounds (and their salts) which have useful hypnotic or sedative properties. The present invention is limited to such compounds, and we do not claim herein the compound 5-isopropylthio-n-propylidene-5-ethyl thiobarbituric acid, which is not included in the foregoing list, but which has the formula given under "Thiobarbituric acid" at the head of the list, wherein R is isopropyl, R' is ethyl and R'' is ethyl, and the melting point is approximately 142–143° C. That compound is different from all those claimed herein, in that it has the peculiar and, so far as we know, unique property, among compounds of this general class, of causing spasms or convulsions, often resulting in violent death, if administered intravenously, even in small doses. Neither it, nor any other compound having similar characteristics or properties, is within our present invention or the claims hereof.

SALTS OF THE NOVEL THIOBARBITURIC ACID DERIVATIVES

The sodium salts of the thiobarbituric acids described above may be prepared by dissolving 1 mole of the appropriate disubstituted thiobarbituric acid in the minimum quantity of hot absolute alcohol and adding a solution containing one equivalent of sodium in absolute alcohol. On cooling, or on evaporation of the alcohol, the sodium salt separates as crystals, or in powder form. In some instances a syrup results and this material, when stirred with dry ether, gives the sodium salt in powder form.

Other alkali-metal salts may also be prepared by a similar procedure, using the appropriate metal.

The sodium salts of our novel thiobarbituric acid derivatives have been found to be readily soluble in water, and their aqueous solutions are alkaline in reaction. When administered orally or hypodermically in proper dosage they are good and useful hypnotics or sedatives, and range in duration of action from long to ultra-short acting.

Calcium salts of our novel compounds may be prepared by treating an absolute alcohol solution of the corresponding sodium salt with the metathetical amount of alcoholic calcium chloride, filtering off the precipitated sodium chloride, and concentrating the alcoholic solution to yield the calcium salt.

The ammonium, alkyl and alkanol ammonium salts of the novel compounds may be prepared by dissolving the corresponding thiobarbituric acid in an excess of ammonia or amine and subsequently removing the excess quantity of base.

In the following claims it is to be understood that the expression: "thiobarbituric acid derivative," or similar expression, includes, also, the salts of such derivatives, such as, for example, the salts of our novel compounds as described above.

The examples given above, and illustrative processes for their production, include, the best embodiments of our present invention now known to us; but it is to be understood that the invention is not necessarily or specifically limited thereto and may, under proper conditions, have other embodiments, produced in other ways, without departure from the spirit of the invention, and within the scope of the following claims.

We claim:

1. A new composition of matter useful in therapeutics, comprising a 5,5 disubstituted thiobarbituric acid derivative having, physiologically, the property of producing a hypnotic or sedative action, and having the formula:

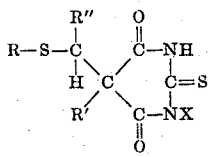

wherein R is a hydrocarbon group, either saturated or unsaturated; R' is a primary hydrocarbon group, either saturated or unsaturated; R'' is a saturated hydrocarbon group; and wherein R, R' and R'' each contain not more than six carbon atoms and the sum of the carbon atoms in R, R' and R'' does not exceed ten; R has a carbon atom attached directly to the sulfur of the thiocarbinyl group

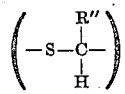

and R' has a carbon atom attached directly to the carbon atom forming the barbituric acid nucleus; and wherein X is a member of a group consisting of hydrogen, alkali-metal, an equivalent of alkaline earth metal, ammonium, monoalkylammonium, dialkylammonium, alkanol ammonium, and an equivalent of alkylene diammonium, and wherein ethyl is excluded as R'' when R is isopropyl and R' is ethyl.

2. A thiobarbituric compound according to claim 1 wherein X represents hydrogen.

3. A thiobarbituric compound according to claim 1 wherein R is a primary hydrocarbon group.

4. A thiobarbituric compound according to claim 1 wherein R is a primary hydrocarbon group and X represents hydrogen.

5. A thiobarbituric compound according to claim 1 wherein R is a saturated primary hydrocarbon group.

6. A thiobarbituric compound according to claim 1 wherein R is a saturated primary hydrocarbon group and X represents hydrogen.

7. A thiobarbituric compound according to claim 1 wherein R and R' are saturated primary hydrocarbon groups.

8. A thiobarbituric compound according to claim 1 wherein R and R' are saturated primary hydrocarbon groups and X represents hydrogen.

9. A thiobarbituric compound according to claim 1 wherein R, R' and R'' are all saturated primary hydrocarbon groups.

10. A thiobarbituric compound according to claim 1 wherein R, R' and R'' are all saturated primary hydrocabon groups and X represents hydrogen.

11. A thiobarbituric compound according to claim 1 wherein R and R' are saturated primary hydrocarbon groups and R'' is a methyl group.

12. A thiobarbituric compound according to claim 1 wherein R and R' are saturated primary hydrocarbon groups, R'' is a methyl group and X is hydrogen.

13. A thiobarbituric compound according to claim 1 wherein R is a saturated primary hydrocarbon group, R' is an ethyl group, and R'' is a methyl group.

14. A thiobarbituric compound according to claim 1 wherein R is a saturated primary hydrocarbon group, R' is an ethyl group, R'' is a methyl group and X represents hydrogen.

15. A thiobarbituric compound according to claim 1 wherein R is a saturated hydrocarbon group containing 5 carbon atoms, R' is an ethyl group, and R'' is a methyl group.

16. A thiobarbituric compound according to claim 1 wherein R is a saturated hydrocarbon group containing 5 carbon atoms, R' is an ethyl group, R'' is a methyl group and X represents hydrogen.

17. A thiobarbituric compound according to claim 1 wherein R is a secondary hydrocarbon group, R' and R'' are primary hydrocarbon groups.

18. A thiobarbituric compound according to claim 1 wherein R is a secondary hydrocarbon group, R' and R'' are primary hydrocarbon groups and X represents hydrogen.

19. A thiobarbituric compound according to claim 1 wherein R is a saturated secondary hydrocarbon group and R' and R'' are saturated primary hydrocarbon groups.

20. A thiobarbituric compound according to claim 1 wherein R is a saturated secondary hydrocarbon group, R' and R'' are saturated primary hydrocarbon groups and X represents hydrogen.

21. A thiobarbituric compound according to claim 1 wherein R and R' are primary hydrocarbon groups and R'' is a saturated secondary hydrocarbon group.

22. A thiobarbituric compound according to claim 1 wherein R and R' are primary hydrocarbon groups, R'' is a saturated secondary hydrocarbon group and X represents hydrogen.

23. A thiobarbituric compound according to claim 1 wherein R and R' are saturated primary hydrocarbon groups and R'' is a saturated secondary hydrocarbon group.

24. A thiobarbituric compound according to claim 1 wherein R and R' are saturated primary hydrocarbon groups, R'' is a saturated secondary hydrocarbon group and X represents hydrogen.

25. A new composition of matter useful in therapeutics, comprising: 5-cyclohexylthioethylidene-5-methyl-2-thiobarbituric acid having the formula:

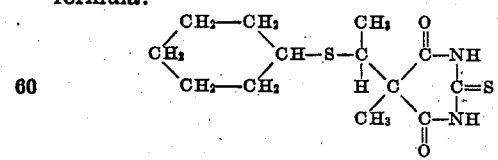

26. A new composition of matter useful in therapeutics, comprising: 5-ethylthioisobutylidene-5-ethyl-2-thiobarbituric acid having the formula:

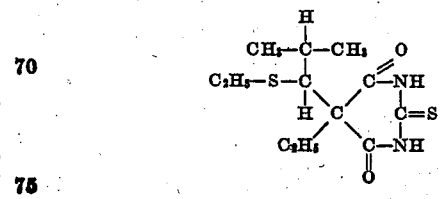

27. The process of producing a 5,5 disubstituted 2-thiobarbituric acid derivative according to claim 1, which comprises condensing the corresponding 5,5 disubstituted malonic ester with thiourea in the presence of a sodium alcoholate.

28. A new composition of matter useful in therapeutics, comprising: 5-n-amylthioethylidene-5-ethyl-2-thiobarbituric acid having the formula

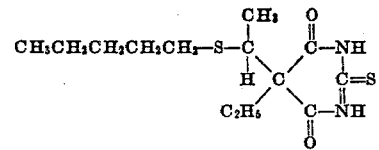

LEWIS A. WALTER.
LOUIS H. GOODSON.